US012544995B2

(12) United States Patent
Jensen et al.

(10) Patent No.: US 12,544,995 B2
(45) Date of Patent: Feb. 10, 2026

(54) METHOD OF REPAIRING A WIND TURBINE BLADE AND RESPECTIVELY REPAIRED WIND TURBINE BLADE

(71) Applicant: Siemens Gamesa Renewable Energy A/S, Brande (DK)

(72) Inventors: Jonas Pagh Jensen, Aalborg SV (DK); Jakob Maennchen, Aalborg (DK); Harald Stecher, Skørping (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 98 days.

(21) Appl. No.: 18/705,293

(22) PCT Filed: Oct. 26, 2022

(86) PCT No.: PCT/EP2022/079951
§ 371 (c)(1),
(2) Date: Apr. 26, 2024

(87) PCT Pub. No.: WO2023/078756
PCT Pub. Date: May 11, 2023

(65) Prior Publication Data
US 2025/0262826 A1  Aug. 21, 2025

(30) Foreign Application Priority Data
Nov. 8, 2021  (EP) .................................... 21206905

(51) Int. Cl.
*B29C 73/02* (2006.01)
*B29L 31/08* (2006.01)
*F03D 1/06* (2006.01)
*F03D 80/50* (2016.01)

(52) U.S. Cl.
CPC ............ *B29C 73/02* (2013.01); *F03D 1/0675* (2013.01); *F03D 80/50* (2016.05); *B29L 2031/085* (2013.01)

(58) Field of Classification Search
CPC ............... B29C 73/02; B29L 2031/085; F05B 2230/80; Y02E 10/72; F03D 1/0675; F03D 80/50; F03D 80/502; B29D 99/0028
See application file for complete search history.

(56) References Cited

U.S. PATENT DOCUMENTS

| 2004/0110010 A1 | 6/2004 | Buchwalter et al. |
| 2011/0097211 A1 | 4/2011 | Rudling |
| 2013/0294921 A1* | 11/2013 | Pind ................... C08G 18/4891 |
| | | 156/305 |
| 2014/0077420 A1* | 3/2014 | Fang ...................... C08L 33/06 |
| | | 264/494 |
| 2018/0194918 A1 | 7/2018 | Goh et al. |
| 2019/0309733 A1* | 10/2019 | Grishauge ............. B29C 64/393 |
| 2022/0144999 A1* | 5/2022 | Morino ................ C08G 59/226 |

FOREIGN PATENT DOCUMENTS

| CN | 102702838 | * | 11/2013 | |
| CN | 102702838 B | * | 11/2013 | |
| FR | 3063774 A1 | * | 9/2018 | ........... F03D 1/0675 |
| WO | WO-2010144971 A1 | * | 12/2010 | ........... C08G 59/502 |
| WO | WO-2014053268 A1 | * | 4/2014 | ........... C08G 18/755 |
| WO | WO-2015120941 A1 | * | 8/2015 | ............. C08G 18/12 |
| WO | WO-2019122103 A1 | * | 6/2019 | ........... F03D 1/0675 |
| WO | WO-2020264115 A1 | * | 12/2020 | ........... B29C 64/314 |
| WO | WO-2023026761 A1 | * | 3/2023 | ........... F03D 80/502 |

OTHER PUBLICATIONS

PCT International Search Report and Written Opinion of International Searching Authority mailed Jan. 31, 2023 corresponding to PCT International Application No. PCT/EP2022/079951 filed Oct. 26, 2022.

* cited by examiner

*Primary Examiner* — Sue A Purvis
(74) *Attorney, Agent, or Firm* — Schmeiser, Olsen & Watts, LLP

(57) ABSTRACT

A method of repairing a wind turbine blade including a resin containing a cleavable functional group is provided, the method including applying an acidic aqueous liquid including an acid to a portion of a surface of the wind turbine blade, heating the portion of the surface of the wind turbine blade, applying a basic aqueous liquid including a base to the portion of the surface of the wind turbine blade. In addition, a repaired wind turbine blade obtainable by this method is also provided.

15 Claims, No Drawings

METHOD OF REPAIRING A WIND TURBINE BLADE AND RESPECTIVELY REPAIRED WIND TURBINE BLADE

CROSS-REFERENCE TO RELATED APPLICATIONS

This application claims priority to PCT Application No. PCT/EP2022/079951, having a filing date of Oct. 26, 2022, which claims priority to EP Application No. 21206905.8, having a filing date of Nov. 8, 2021, the entire contents both of which are hereby incorporated by reference.

FIELD OF TECHNOLOGY

The following relates to the field of wind turbine blades, in particular to a method of repairing a wind turbine blade and a respectively repaired wind turbine blade.

BACKGROUND

Wind power is considered one of the cleanest, most environmentally friendly energy sources presently available, and wind turbines have gained increased attention for utilizing this energy source. A modern wind turbine typically includes a tower, generator, gearbox, nacelle, and one or more rotor blades. The rotor blades capture kinetic energy of wind and transmit the kinetic energy in the form of rotational energy so as to turn a shaft coupling the rotor blades to a gearbox or directly to the generator. The generator then converts the mechanical energy to electrical energy that may be fed into a power grid.

During operation, wind turbine blades typically suffer from a continuous exposure to influences from the surrounding, such as impact of airborne particles and water rain at high speed, which may result in damages of the wind turbine blades. Also repeated temperature and humidity changes may cause damages, such as cracks, of the wind turbine blades. Small repairs of blades in service require certain outside conditions to be properly conducted. The standard repair materials for epoxy-based blades are epoxy-amine systems as well. The minimum use temperature of repair materials is usually down to 15 C, but not below. This limits the available time for repair work on site and may lead to extended downtime which is linked with massive costs for the turbine operator.

Therefore, only a short time window for repair is often available. If the temperature is only slightly below the required minimum temperature, a heating tent may be used to raise the laminate and surrounding temperature to some extent, which causes however additional costs and efforts. If the temperature or humidity is clearly below (or above) the process window, then the repair cannot be conducted.

Thus, there may be a need for a repair process of wind turbine blades with reduced equipment required and which can be applied independently from the outside conditions, such as temperature and humidity.

SUMMARY

An aspect relates to a method of (on-site) repairing a wind turbine blade comprising a resin containing a cleavable functional group (in particular an acid-cleavable functional group), the method comprising applying an acidic aqueous liquid (having a pH of less than 7) comprising an acid to a portion (to be repaired, e.g., a damaged area) of a surface of the wind turbine blade, heating the portion of the surface of the wind turbine blade (where the acidic aqueous liquid has been applied), applying a basic (alkaline) aqueous liquid (having a pH of more than 7) comprising a base (alkaline compound) to the portion of the surface of the wind turbine blade (where the acidic aqueous liquid has been applied), optionally (in particular in case of large cracks) applying a (reactive) hot melt adhesive comprising an isocyanate or a blocked isocyanate to the portion of the surface of the wind turbine blade (where the acidic aqueous liquid and the basic aqueous liquid have been applied), optionally drying that portion of the surface of the wind turbine blade.

According to an aspect of embodiments of the invention, there is provided a (repaired) wind turbine blade obtainable (or obtained) by a method as described herein.

These aspects of embodiments of the invention are based on the idea that cracks in a surface of a wind turbine blade comprising a resin containing a cleavable functional group (in particular an acid-cleavable functional group) may be repaired by applying an acidic aqueous liquid to the surface portion to be repaired, followed by heating the surface portion where the acidic aqueous liquid has been applied. Without wishing to be bound to any theory, the present inventors assume that by heating an acid-treated surface the cleavable functional groups of the resin in an outermost layer of the wind turbine blade can be cleaved, thereby generating for instance free hydroxy groups at the resin. Moreover, hereby at least part of the resin in an outermost layer of the wind turbine blade may become dissolved in the acidic aqueous liquid and/or a thermoset structure in an outermost layer of the wind turbine blade may be at least partially converted into a thermoplastic material. As a result of these changes, smalls cracks may be closed or sealed upon heating, in particular due to flow or entry of dissolved resin into the cracks and/or the developed thermoplastic properties or behavior of the resin. Subsequently, a basic aqueous liquid is applied so as to neutralize the applied acidic aqueous liquid. Moreover, any dissolved resin may be precipitated again (while remaining thermoplastic), which further promotes sealing of cracks. In case of larger cracks, a (reactive) hot melt adhesive comprising (optionally blocked) isocyanate functional groups may be applied such that covalent bonds between the (unblocked) isocyanate functional group of the hot melt adhesive and hydroxy groups of the resin (which may be generated as a result of the cleavage described above) may be formed, i.e., the thermoplastic may be re-crosslinked to further enhance the mechanical properties. As a result, the wind turbine blade may be efficiently repaired on-site with reduced equipment required and independently from the outside conditions, such as temperature and humidity.

DETAILED DESCRIPTION

Hereinafter, details of embodiments of the present invention and other features and advantages thereof will be described. However, embodiments of the present invention are not limited to the following specific descriptions, but they are rather for illustrative purposes only.

It should be noted that features described in connection with one exemplary embodiment or exemplary aspect may be combined with any other exemplary embodiment or exemplary aspect, in particular features described with any exemplary embodiment of a method of repairing may be combined with any other exemplary embodiment of a method of repairing and with any exemplary embodiment of a wind turbine blade and vice versa, unless specifically stated otherwise.

Where an indefinite or definite article is used when referring to a singular term, such as "a", "an" or "the", a plural of that term is also included and vice versa, unless specifically stated otherwise.

The expression "comprising", as used herein, includes not only the meaning of "comprising", "including" or "containing", but may also encompass "consisting essentially of" and "consisting of".

Unless specifically stated otherwise, the expression "at least partially", "at least a partial" or "at least (a) part of", as used herein, may mean at least 5% thereof, in particular at least 10% thereof, in particular at least 15% thereof, in particular at least 20% thereof, in particular at least 25% thereof, in particular at least 30% thereof, in particular at least 35% thereof, in particular at least 40% thereof, in particular at least 45% thereof, in particular at least 50% thereof, in particular at least 55% thereof, in particular at least 60% thereof, in particular at least 65% thereof, in particular at least 70% thereof, in particular at least 75% thereof, in particular at least 80% thereof, in particular at least 85% thereof, in particular at least 90% thereof, in particular at least 95% thereof, in particular at least 98% thereof, and may also mean 100% thereof.

In a first aspect, a method of (on-site) repairing a wind turbine blade comprising a resin containing a cleavable functional group (in particular an acid-cleavable functional group) comprises applying an acidic aqueous liquid (having a pH of less than 7) comprising an acid to a portion (to be repaired) of a surface of the wind turbine blade, heating the portion of the surface of the wind turbine blade (where the acidic aqueous liquid has been applied), applying a basic (alkaline) aqueous liquid (having a pH of more than 7), comprising a base (alkaline compound) to the portion of the surface of the wind turbine blade (where the acidic aqueous liquid has been applied).

In embodiments, the method of repairing may be carried out on-site, i.e., while the wind turbine blade is installed at a wind turbine, which has the great advantage that downtime of the wind turbine can be kept to a minimum. In embodiments, the method of repairing may however also be suitable for repairing cracks or other defects that occurred during the manufacturing, storage and/or transport of the wind turbine blade. Thus, in embodiments, the method of repairing may also be performed before the wind turbine blade is installed at a wind turbine. Moreover, in embodiments, the method of repairing may also be suitable for repairing a wind turbine blade after its uninstallation from a wind turbine, for instance if the wind turbine blade is intended to be reused (recycled) in another (or the same) wind turbine.

The wind turbine blade to be repaired by the method described herein comprises a resin containing a cleavable functional group. In particular, the wind turbine blade may comprise a (bulk) material or substrate comprising a (glass) fiber reinforced polymer resin composite comprising a resin containing a cleavable functional group.

In an embodiment, the resin comprises at least one of an epoxy-based resin and an epoxy-amine-based resin. Commercially available examples thereof are based on Recyclamine® (from Aditya Birla Chemicals) or Cleavamine® (from Adesso Advanced Materials) technology for instance.

In the context of the present application, the term "cleavable functional group" may particularly denote a functional group having a covalent bond that may be cleaved under certain conditions (e.g., temperature, pH value, reagent). For instance, the cleavable functional group may in particular be an acid-cleavable functional group, i.e., a functional group having a covalent bond that may be cleaved by an acid or under acidic conditions (pH of less than 7).

In an embodiment, the cleavable functional group comprises at least one of an acetal and a ketal functional group. An acetal or a ketal is generally represented by the following chemical formulas:

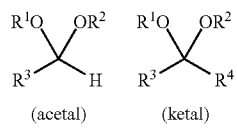

wherein $R^1$, $R^2$, $R^3$ and $R^4$ independently from each other represent an organic (carbon atom-containing) moiety. As it is known to a person skilled in the conventional art, an acetal or a ketal can be cleaved by hydrolysis under acidic conditions to yield two alcohols ($R^1$—OH and $R^2$—OH in the above general formulas) and an aldehyde ($R^3$—CHO in the above general formula of an acetal) or a ketone ($R^3$—C(=O)—$R^4$ in the above general formula of a ketal).

In an embodiment, the acidic aqueous liquid has a pH value of less than 7, in particular of less than 6, in particular of less than 5, in particular of less than 4. Moreover, the acidic aqueous liquid may have a pH value of more than 0, in particular of more than 1.

In an embodiment, the acid is an organic acid or a carboxylic acid, rather than a mineral acid. An organic acid or a carboxylic acid may not only be particularly suitable for adjusting an appropriate pH, but may additionally also act as a solvent for a reaction product of the resin after cleavage of the cleavable functional group. Moreover, it may be advantageous if the organic acid or carboxylic acid has a good miscibility with water or a water/solvent-mixture and may also dissolve non-polar substances.

In an embodiment, the acid comprises a monocarboxylic acid, a dicarboxylic acid, a tricarboxylic acid and/or a polycarboxylic acid, in particular selected from the group consisting of aliphatic monocarboxylic acids, aliphatic dicarboxylic acids, aliphatic tricarboxylic acids and aliphatic polycarboxylic acids. For instance, the acid may be selected from the group consisting of acetic acid, lactic acid, maleic acid, fumaric acid, tartaric acid, oxalic acid, malonic acid, succinic acid, adipic acid and citric acid. Combinations of two or more of these acids are suitable as well.

In an embodiment, the acid comprises at least one selected from the group consisting of acetic acid, lactic acid, citric acid, oxalic acid, tartaric acid or combinations of two or more of foregoing. In embodiments, the acid may comprise acetic acid (for instance in a concentration of 30% by mass of the acidic aqueous liquid), which has proven particularly suitable for the purposes of embodiments of the present invention.

In an embodiment, the acidic aqueous liquid further comprises a solvent, in particular a polar solvent, a polar protic solvent. The term "polar solvent", as used herein, refers to a solvent that has a good miscibility with water. The term "protic solvent", as used herein, refers to a solvent that is capable of donating protons, for instance via hydrogen bonding. It may be advantageous if the acidic aqueous liquid comprises a solvent that is capable to migrate into a thermoset structure of the resin and swell it, for example in combination with the ability to form strong hydrogen bonds, thereby cleaving (or at least weakening) the hydrogen bonds of the thermoset structure. Suitable examples of the solvent include ethanol, propanol (1-propanol or 2-propanol), butanol, dimethyl sulfoxide (DMSO) and combinations of two or more thereof.

In an embodiment, the acidic aqueous liquid is immobilized on and/or in a carrier and/or in form of a hydrogel when applied. For instance, the acidic aqueous liquid may be soaked in a carrier, such as a fleece (non-woven fabric) or sponge. Additionally or alternatively, the acidic aqueous liquid may be immobilized in form of a hydrogel, such as a chitosan-based hydrogel. By taking this measure, it may be avoided that the acidic aqueous liquid runs off or drains off from the portion of the surface of the wind turbine blade to be repaired. Moreover, the acidic aqueous liquid may be selectively applied to the portion to be repaired by adjusting the carrier or the hydrogel to the size of the damaged area, thereby avoiding that undamaged portions of the wind turbine blade surface are affected.

After the acidic aqueous liquid has been applied to the portion to be repaired of the surface of the wind turbine blade, a heating step is carried out. To this end, the portion where the acidic aqueous liquid has been applied may be covered with a heating device, such as a heating blanket.

In an embodiment, the heating of the portion of the surface of the wind turbine blade is carried such that at least part of the cleavable functional groups of the resin in an outermost layer of the wind turbine blade are cleaved (thereby forming (free) hydroxy groups at the resin). An example of cleaving a ketal functional group of an epoxy-amine-based resin is illustrated by the following chemical cleavage reaction:

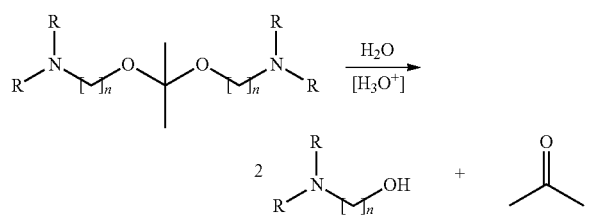

As it is evident from the above reaction scheme, an epoxy-amine-based resin having a cleavable ketal functional group is hydrolyzed in the presence of an acid (catalyst), thereby forming cleaved resin parts having a (free) hydroxy group and a ketone (more specifically, acetone in the depicted example). The generated hydroxy groups may be used for coupling with isocyanate functional groups of a hot melt adhesive, as will be described in further detail below.

In an embodiment, the heating of the portion of the surface of the wind turbine blade is carried such that at least part of the resin in an outermost layer of the wind turbine blade is (gets, becomes) dissolved in the acidic aqueous liquid, for instance because of a protonation of an amine group in an epoxy-amine-based resin in the above depicted example. Resin in dissolved form may enter or flow into cracks in the damaged surface of the wind turbine blade and may subsequently be precipitated therein (by applying a basic solution as explained in further detail below), thereby contributing to a sealing of the cracks.

In an embodiment, the heating of the portion of the surface of the wind turbine blade is carried such that a thermoset structure in an outermost layer of the wind turbine blade is (at least partially) converted into a thermoplastic material. Due to the developed thermoplastic properties, smalls cracks may be closed or sealed upon heating.

In the context of the present application, the term "outermost layer of the wind turbine blade" may particularly denote a surface layer (of the wind turbine blade) having a thickness of up to 1 mm, in particular up to 0.5 mm.

In an embodiment, the portion of the surface of the wind turbine blade is heated to a temperature in a range of from 70° C. to 100° C., such as from 80° C. to 90° C., and/or for a heating time in a range of from 1 min to 1 h, such as from 5 min to 45 min. By taking this measure, the cleavage of the cleavable functional groups of the resin may be controlled such that a sufficient amount of cleavable functional groups resin in an outermost layer of the wind turbine blade is cleaved, while avoiding cleavage in the bulk material of the wind turbine blade (i.e., underneath the outermost layer), Moreover, by taking this measure, the cleavage of the cleavable functional groups of the resin may be controlled such that a sufficient amount of the resin in an outermost layer of the wind turbine blade is dissolved and/or such that a thermoset structure in an outermost layer of the wind turbine blade is sufficiently converted into a thermoplastic material.

If the acidic aqueous liquid is applied in immobilized form, such as by a carrier and/or as a hydrogel, the immobilization means (e.g., carrier and/or hydrogel matrix) is for example removed after the heating step.

After the portion to be repaired of the surface of the wind turbine blade has been acid-treated and heated, and optionally an applied acid immobilization means has been removed, a basic (alkaline) aqueous liquid comprising a base (alkaline compound) is applied to that portion of the surface of the wind turbine blade.

In an embodiment, the basic aqueous liquid has a pH value of more than 7, in particular of more than 8, in particular of more than 9, in particular of more than 10. Moreover, the basic aqueous liquid may have a pH value of less than 14, in particular of less than 13.

In an embodiment, the basic aqueous liquid is applied such that the applied acidic aqueous liquid is neutralized. In embodiments, the pH at the portion to be repaired portion of the surface of the wind turbine blade may be raised, for instance to more than 5, in particular to more than 6, such as to pH 7 or more.

In an embodiment, the basic aqueous liquid is applied such that dissolved resin is precipitated (while remaining thermoplastic). As explained above, at least part of the resin in an outermost layer of the wind turbine blade may be dissolved in the acidic aqueous liquid, for instance because of a protonation of an amine group in an epoxy-amine-based resin, and such resin in dissolved form may enter or flow into cracks in the damaged surface of the wind turbine blade. The basic aqueous liquid may be applied such that dissolved resin is precipitated again, for instance because of a deprotonation of a previously protonated amine group in an epoxy-amine-based resin. As a result, such precipitated resin present in cracks of the damaged surface of the wind turbine blade may contribute to and improve a sealing of the cracks, all the more as the precipitated resin may still be thermoplastic and thereby further seal the cracks.

In an embodiment, the base (alkaline compound) is selected from the group consisting of a hydroxide, a hydrogen carbonate (bicarbonate) and a carbonate. For instance, sodium salts thereof, such as sodium hydrogen carbonate ($NaHCO_3$), may be particularly suitable and cost-efficient.

In an embodiment, the method further comprises, after the step of applying a basic aqueous liquid, a step of applying (one or more layers of) a (reactive) hot melt adhesive comprising an isocyanate functional group or a blocked isocyanate functional group to the portion of the surface of the wind turbine blade (where the acidic aqueous liquid and the basic aqueous liquid have been applied). By taking this measure, also larger cracks may be efficiently sealed. The hot melt adhesive may be applied in sheet form or in powder form. The hot melt adhesive may be solid and may in particular comprise a polyurethane (PU) hot melt adhesive, which may have a similar melting point as the thermoplastic material obtainable from the resin of the wind turbine blade. The hot melt adhesive comprises an isocyanate functional group or a blocked isocyanate functional group. Suitable examples for a blocked isocyanate functional group include an isocyanate functional group blocked with an alcohol (i.e., as a urethane or carbamate functional group) and/or an amine (i.e., as a urea functional group). Prior to a subsequent reaction as will be described below, a blocked isocyanate functional group has to be unblocked by cleavage of the blocking moieties (such as alcohol or amine), for instance by heating the blocked isocyanate functional group to an appropriate temperature for the release of the respective blocking moieties, as known to a person skilled in the conventional art.

In an embodiment, the (reactive) hot melt adhesive is applied such that covalent bonds between the (unblocked) isocyanate functional group of the hot melt adhesive and hydroxy groups of the resin are formed; in other words, such that (unblocked) isocyanate functional groups of the hot melt adhesive react with hydroxy groups of the resin that have been formed from the cleavable functional groups of the resin. By taking this measure, a strong covalent bond between adhesive and the newly formed hydroxy groups can be established, and the thermoplastic can be re-crosslinked to enhance the mechanical properties of the thermoplastic further.

In an embodiment, the method further comprises, after the step of applying a basic aqueous liquid and optionally the step of applying a hot melt adhesive, a step of drying the portion of the surface of the wind turbine blade. In an embodiment, the drying may involve an active drying, such as by heating. The drying may however also involve a passive drying, i.e., allowing to dry.

In a further aspect, a (repaired) wind turbine blade obtainable or obtained by a method as described herein. By the method of repairing as described herein, not only cracks of a wind turbine blade to be repaired may be closed or sealed, but a thus-repaired wind turbine blade also differs from an original (brand-new) wind turbine blade in that initially present cleavable functional groups have been consumed by the repairing process, in particular by cleavage of bonds and release of for instance aldehydes and/or ketones, as evident from the cleavage reaction scheme depicted above.

The embodiments of the invention described in this document can be descriptively summarized as follows:

The surface of the damaged area on a wind turbine blade may be wetted with an aqueous acid, e.g., 30% acetic acid which can act both as solvent and acid and which was proven to work well for the purpose as described herein. Other acids can be e.g., lactic acid, citric acid, oxalic, tartaric acid, which can be used with or without an additional solvent e.g., a polar solvent like ethanol, butanol or DMSO. Generally, the acid shall have good solubility/miscibility in water or water/solvent mix, and shall be able to act as a solvent as well. Ideally the acid is able to interact with and dissolve also non-polar substances. The optional solvent shall be able to migrate into the thermoset structure and swell it, ideally combined with the ability to form strong hydrogen bonds (polar protic solvents) and thus cleaving the hydrogen bonds found in the thermoset structure.

According to an embodiment of the invention, the acidic solution is soaked in a carrier (fleece, sponge or similar) or immobilized in form of a hydrogel (e.g., chitosan based) to avoid the solution to run off. The carrier or gel containing the acid catalyst may be adjusted to the size of the damaged area to avoid undamaged areas being affected. The damaged area may be covered with a heating device e.g., a heating blanket. The damaged area is heated to 80-90 C to activate the surface by cleavage of acetal/ketal groups in the network. The heating time shall be enough to cleave the acetal bonds in the outermost layer of the blade to convert the thermoset structure into a thermoplastic material. But a heating time should be chosen that avoids cleavage in the bulk material. Based on experiments, the heating time shall not be more than one hour.

After heating, the acidic solution may be neutralized. In case a carrier or immobilized acid has been used, the material is removed, and the surface is treated with a slightly basic solution, e.g., a hydroxy or carbonate-based base such as $NaHCO_3$ and the surface may be completely dried afterwards.

Depending on the size of the damage, the formed thermoplastic material may be used to stabilize a small crack by welding. For larger damages one or several layers of a reactive hot melt polyurethane (PU) solid adhesive (in sheet or powder form) are added, which have a similar melting point as the thermoplastic received from the laminate matrix. The reactive PU hot met adhesive contain an isocyanate or blocked isocyanate component that can react with the free alcohol groups of the cleaved epoxy resin (which are depicted in the cleavage reaction scheme above) that is obtained in the acid and sequential base treatment. With this strategy a strong covalent bond between adhesive and the newly formed reactive groups can be established, and the thermoplastic can be re-crosslinked to enhance the already good mechanical properties of the thermoplastic further.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of repairing a wind turbine blade comprising a resin comprising a cleavable functional group, the method comprising:
    applying an acidic aqueous liquid comprising an acid to a portion of a surface of the wind turbine blade,
    heating the portion of the surface of the wind turbine blade,
    applying a basic aqueous liquid comprising a base to the portion of the surface of the wind turbine blade.

2. The method as set forth in claim 1, wherein the resin comprises at least one of an epoxy-based resin and an epoxy-amine-based resin.

3. The method as set forth in claim 1, wherein the cleavable functional group comprises at least one of an acetal and a ketal functional group.

4. The method as set forth in claim 1, wherein the acid is an organic acid.

5. The method as set forth in claim 1, wherein the acid comprises at least one selected from the group comprising of acetic acid, lactic acid, citric acid, oxalic acid and tartaric acid.

6. The method as set forth in claim 1, wherein the acidic aqueous liquid further comprises a solvent, a polar solvent, such as a solvent selected from the group comprising of ethanol, propanol, butanol and dimethyl sulfoxide.

7. The method as set forth in claim 1, wherein the acidic aqueous liquid is immobilized on and/or in a carrier and/or in form of a hydrogel when applied.

8. The method as set forth in claim 1,
wherein the surface of the wind turbine blade is heated
such that at least part of the cleavable functional groups of the resin in an outermost layer of the wind turbine blade are cleaved and/or
such that at least part of the resin in an outermost layer of the wind turbine blade is dissolved in the acidic aqueous liquid and/or
such that a thermoset structure in an outermost layer of the wind turbine blade is at least partially converted into a thermoplastic material.

9. The method as set forth in claim 1, wherein the surface of the wind turbine blade is heated to a temperature in a range of from 70° C. to 100° C. and/or for a heating time in a range of from 1 min to 1 h.

10. The method as set forth in claim 1,
wherein the basic aqueous liquid is applied
such that the applied acidic aqueous liquid is neutralized and/or
such that dissolved resin is precipitated.

11. The method as set forth in claim 1, wherein the base is selected from the group comprising of a hydroxide, a hydrogen carbonate and a carbonate.

12. The method as set forth in claim 1, wherein the method further comprises:
after the step of applying a basic aqueous liquid, applying a hot melt adhesive comprising an isocyanate functional group or a blocked isocyanate functional group to the portion of the surface of the wind turbine blade.

13. The method as set forth in claim 1, wherein the hot melt adhesive is applied such that covalent bonds between the isocyanate functional group of the hot melt adhesive and hydroxy groups of the resin are formed.

14. The method as set forth in claim 1, wherein the method further comprises:
after the step of applying a basic aqueous liquid and optionally the step of applying a hot melt adhesive, drying the portion of the surface of the wind turbine blade.

15. A wind turbine blade obtainable by a method according to claim 1.

* * * * *